(12) United States Patent  (10) Patent No.: US 7,652,846 B2
Kondo  (45) Date of Patent: Jan. 26, 2010

(54) MAGNETIC HEAD SLIDER WITH OPTIMIZED FLYING ATTITUDE

(75) Inventor: Yasuyuki Kondo, Niigata-ken (JP)

(73) Assignee: TDK Corporation, Tokyo (JP)

( * ) Notice: Subject to any disclaimer, the term of this patent is extended or adjusted under 35 U.S.C. 154(b) by 405 days.

(21) Appl. No.: 11/436,303

(22) Filed: May 18, 2006

(65) Prior Publication Data

US 2006/0268460 A1  Nov. 30, 2006

(30) Foreign Application Priority Data

May 26, 2005 (JP) ............................. 2005-153316

(51) Int. Cl.
G11B 5/60 (2006.01)
G11B 17/32 (2006.01)
G11B 21/21 (2006.01)

(52) U.S. Cl. .................................. 360/235.8; 360/236

(58) Field of Classification Search .............. 360/235.8, 360/236.3, 235.7, 236.2, 237, 235.5, 235.9, 360/236.1, 236
See application file for complete search history.

(56) References Cited

U.S. PATENT DOCUMENTS

| 5,309,303 | A * | 5/1994 | Hsia et al. ................. 360/236.1 |
| 6,021,020 | A | 2/2000 | Itoh et al. |
| 6,212,032 | B1 * | 4/2001 | Park et al. ................. 360/234.7 |
| 6,678,119 | B1 * | 1/2004 | Pendray et al. ........... 360/236.6 |
| 2003/0227717 | A1 * | 12/2003 | Cha et al. ................. 360/236.2 |
| 2004/0012887 | A1 * | 1/2004 | Rajakumar et al. ....... 360/236.2 |
| 2004/0027724 | A1 | 2/2004 | Pendray et al. |
| 2004/0150916 | A1 * | 8/2004 | Rao et al. ................. 360/235.8 |

FOREIGN PATENT DOCUMENTS

| JP | 09-330510 | 12/1997 |
| JP | 10-283622 | 10/1998 |
| JP | 11-273048 | 10/1999 |
| JP | 2002-109710 | 4/2002 |
| JP | 2004-071140 | 3/2004 |

OTHER PUBLICATIONS

Office Action for corresponding Chinese Patent Application Serial No. 2006100899253.
Notification of Reasons for Refusal for corresponding Japanese Patent Application Serial No. 2005-153316, dated Aug. 14, 2007.
Office Action for corresponding Chinese Patent Application Serial No. 2006100899253, Nov. 9, 2007.

* cited by examiner

*Primary Examiner*—Craig A Renner
*Assistant Examiner*—Tamara Ashford
(74) *Attorney, Agent, or Firm*—Brinks Hofer Gilson & Lione

(57) ABSTRACT

A magnetic head slider is configured wherein on the trailing side, which is divided in the lateral direction, a first right-side groove portion and a first left-side groove portion are formed, on the leading side of the first right-side groove portion and the first left-side groove portion, which is divided in the lateral direction, a second right-side groove portion and a second left-side groove portion are formed, the bottom face of each groove portion serves as a negative pressure generating face, and the negative pressure (absolute value) generated at a first right-side negative pressure generating face and a first left-side negative pressure generating face is greater than the negative pressure (absolute value) generated at a second right-side negative pressure generating face and a second left-side negative pressure generating face.

7 Claims, 12 Drawing Sheets

MAGNETIC HEAD SLIDER WITH OPTIMIZED FLYING ATTITUDE

BACKGROUND OF THE INVENTION

1. Field of the Invention

The present invention relates to a magnetic head slider having a magnetic element for recording to a disk and/or reproduction, and particularly relates to a magnetic head slider capable of reducing fluctuation in flying height due to change in atmospheric pressure or change in skew angle.

2. Description of the Related Art

Japanese Unexamined Patent Application Publication No. 10-283622 (U.S. Pat. No. 6,021,020) discloses various shapes of the face of a magnetic head slider facing a disk.

Incidentally, a groove is formed in the face of a magnetic head slider facing a disk, the bottom face of the groove serves as a surface generating negative pressure, and the raised faces thereof serve as surfaces generating positive pressure. Stabilization of the flying height of a magnetic head slider has been performed in related art by optimizing the shapes of the groove and raised faces, the area ratio of the groove and raised faces occupied in the face facing the disk, or the like.

Incidentally, the flying height is apt to be destabilized by reduction of air inflow caused by deterioration of peripheral velocity or the like due to change in atmospheric pressure or reduction in size of magnetic disks.

In general, the raised faces which generate positive pressure have been provided on the leading side and on the trailing side of a magnetic head slider, and the bottom face of the groove portion which generates negative pressure has been formed between the raised face formed on the leading side and the raised face formed on the trailing side.

Japanese Unexamined Patent Application Publication No. 10-283622, discloses a bottom face of the groove portion which generates negative pressure provided closer to the backward side than the center portion of the magnetic head slider, i.e., on the trailing side (air outflow end side), and thus realizing improvement of flying properties.

However, according to a later-described experiment, we have recognized that, for example, with the magnetic head slider shown in FIG. 28 disclosed in Japanese Unexamined Patent Application Publication No. 10-283622, when reducing fluctuation in flying height due to change in atmospheric pressure, fluctuation in flying height due to change in a skew angle becomes great, and on the other hand, when reducing fluctuation in flying height due to change in a skew angle, fluctuation in flying height due to change in atmospheric pressure becomes great. That is to say, the magnetic head slider shown in FIG. 28 of Japanese Unexamined Patent Application Publication No. 10-283622 fails to simultaneously reduce both fluctuation in flying height due to change in atmospheric pressure and fluctuation in flying height due to change in skew angle.

SUMMARY OF THE INVENTION

The present invention has been made to solve the above-described problems, and accordingly it is a particular object thereof to provide a magnetic head slider capable of appropriately reducing both fluctuation in flying height due to change in atmospheric pressure and fluctuation in flying height due to change in skew angle.

A magnetic head slider according to the present invention includes a slider, and a magnetic element for recording and/or reproduction, which is provided on the air outflow end side of the slider. With the direction toward the air outflow end side from the air inflow end side of the slider as the vertical direction, and the direction intersecting with the vertical direction as the lateral direction, the face of the slider facing a disk includes a first negative pressure generating face provided on the air outflow end side, and a second negative pressure generating face provided closer to the air inflow end side than the first negative pressure generating face. The first negative pressure generating face and the second negative pressure generating face are each divided and provided in the lateral direction. The first negative pressure generating face has negative pressure (absolute value) greater than the second negative pressure generating face.

With the present invention, a first negative pressure generating face and a second negative pressure generating face closer to the air inflow end side than the first negative pressure generating face are provided on the face facing the disk, and moreover, each of the first negative pressure generating face and the second negative pressure generating face is divided and provided in the lateral direction. Further, the negative pressure (absolute value) generated on the first negative pressure generating face is arranged so as to be greater than the negative pressure (absolute value) generated on the second negative pressure generating face.

Thus, negative pressure is appropriately generated on the air outflow end side, whereby fluctuation in flying height due to change in atmospheric pressure can be suppressed. Moreover, as viewed from the first negative pressure generating face, negative pressure, even if it is weak, is generated on the second negative pressure generating face positioned on the air inflow end side, and moreover, the first negative pressure generating face and the second negative pressure generating face are both divided and formed in the lateral direction, whereby positive pressure and negative pressure can be kept in a well-balanced manner even if the flying position of the magnetic head slider over the disk is changed in the radial direction of the disk, and the direction of air flow which flows between the face facing the disk and the disk is changed due to change in skew angle, and consequently, both fluctuation in flying height due to change in the position of the magnetic head slider over the disk (hereinafter, this is referred to as fluctuation in flying height due to change in skew angle), and fluctuation in flying height due to change in atmospheric pressure can be reduced.

Also preferably, with the present invention, the face facing the disk includes on the air outflow end side a magnetic element face which is raised toward the disk direction, and the surface of the magnetic element is exposed, an air inflow end side raised face raised with the same height as the magnetic element face and provided closer to the air inflow end side than the magnetic element face, and the negative pressure generating face positioned closer to the air outflow end side than the air inflow end side raised face, which is lower than the magnetic element face. Each of the negative pressure generating faces is formed in a shape surrounded with at least the air inflow side and both sides of the lateral direction.

Also, a magnetic head slider according to the present invention includes a slider, and a magnetic element for recording and/or reproduction, which is provided on the air outflow end side of the slider. With the direction toward the air outflow end side from the air inflow end side of the slider as the vertical direction, and the direction intersecting with the vertical direction as the lateral direction, the face of the slider facing a disk includes a magnetic element face which is raised toward the disk direction, and the surface of the magnetic element is exposed, an air inflow end side raised face raised with the same height as the magnetic element face and provided closer to the air inflow end side than the magnetic element face, and a negative pressure generating face positioned closer to the air outflow end side than the air inflow end side raised face, which is lower than the magnetic element face. The negative pressure generating face includes a first negative pressure generating face provided on the air outflow end side, and a second negative pressure generating face provided closer to the air inflow end side than the first negative pressure generating face. The first negative pressure generating face and the second negative pressure generating face are divided and provided in the lateral direction. Each of the negative pressure generating faces is made up of the bottom face of a groove portion of which at least the air inflow side and both sides of the lateral direction are surrounded.

According to such a shape of the face of the magnetic head slider facing the disk, negative pressure and positive pressure are kept in a well-balanced manner, whereby both fluctuation in flying height due to change in atmospheric pressure, and fluctuation in flying height due to change in skew angle can be appropriately reduced.

Also preferably, with the present invention, a first extended face extending to the air inflow end side from the magnetic element face with a height higher than the negative pressure generating face but equal to or less than the magnetic element face is formed on the face facing the disk, and the first negative pressure generating face is divided and formed on at least both sides of the lateral direction of the first extended face. Thus, the air is readily guided toward the magnetic element face from the first extended face, also a first negative pressure generating face is formed on both sides of the first extended face connected with the magnetic element face, whereby negative pressure and positive pressure can be kept in a well-balanced manner, and consequently, stabilization of the flying attitude of the magnetic head slider can be kept more appropriately.

Also preferably, with the present invention, a side-raised face divided and formed in the lateral direction with the same height as the magnetic element face is formed on the face facing the disk closer to the air outflow end side than the air inflow end side raised face, the side-raised face is linked with the first extended face through a side-linked face extending with a height higher than the negative pressure generating face but equal to or less than the magnetic element face, and the bottom face of a groove portion surrounded with the first extended face, the side-linked face, and the side-raised face serves as the first negative pressure generating face. Thus, the groove portion of which the bottom face serves as the first negative pressure generating face can be formed on the air outflow end side appropriately.

Also preferably, with the present invention, an extended face with a height higher than the negative pressure generating face but equal to or less than the magnetic element face is formed toward the air outflow end side from the air inflow end side raised face, the extended face includes at least a side-extended face extending from both sides of the lateral direction of the slider toward the air outflow end side direction, and a center-extended face provided between the side extended faces, two groove portions surrounded with the side-extended faces are formed on both sides of the lateral direction of the center-extended face, and each of the bottom faces of the groove portions serves as the second negative pressure generating face. Thus, a second negative pressure generating face which generates negative pressure, even though it is smaller than that of the first negative pressure generating face, can be formed appropriately.

Also, with the present invention, between the magnetic element face and the air inflow end side raised face is preferably linked with a center-linked face connected to the first extended face and the center-extended face, and more preferably, the center-linked face includes rail faces with the same height as the magnetic element face, a plurality of the rail faces are formed in the lateral direction, and also a step face formed with a height dimension lower than the magnetic element face but higher than a negative pressure generating face, which connects between the magnetic element face and the air inflow end side raised face, is formed between the rail faces. Thus, the air flowed toward the air outflow end side from the air inflow end side can guide little remained air reduced due to change in atmospheric pressure or the like to the magnetic element face smoothly efficiently, thereby realizing stabilization of flying attitude more appropriately.

Further preferably, with the present invention, the air inflow end side raised face is divided and formed in the lateral direction, and the step face is formed extending between the air inflow end side raised faces. Thus, the air can be guided toward the magnetic element face from the air inflow end side raised face side more smoothly, whereby stabilization of flying attitude can be realized more appropriately.

With the present invention, a first negative pressure generating face, and a second negative pressure generating face, which is closer to the air inflow end side than the first negative pressure generating face, are provided on the face facing the disk, and moreover, the first negative pressure generating face and the second negative pressure generating face are each divided and provided in the lateral direction. Further, the negative pressure (absolute value) generated at the first negative pressure generating face is arranged so as to be greater than the negative pressure (absolute value) generated at the second negative pressure generating face.

Thus, negative pressure is appropriately generated on the air outflow end side, and accordingly, fluctuation in flying height due to change in atmospheric pressure can be reduced. Moreover, as viewed from the first negative pressure generating face, negative pressure, even if it is weak, is generated on the second negative pressure generating face positioned on the air inflow end side, and moreover, the first negative pressure generating face and the second negative pressure generating face are both divided and formed in the lateral direction, whereby positive pressure and negative pressure can be kept in a well-balanced manner even if the flying position of the magnetic head slider over the disk is changed in the radial direction of the disk, and the direction of air flow which flows between the face facing the disk and the disk is changed due to change in skew angle, and consequently, both fluctuation in flying height due to change in skew angle, and fluctuation in flying height due to change in atmospheric pressure can be reduced.

DESCRIPTION OF THE PREFERRED EMBODIMENTS

Figure 1:
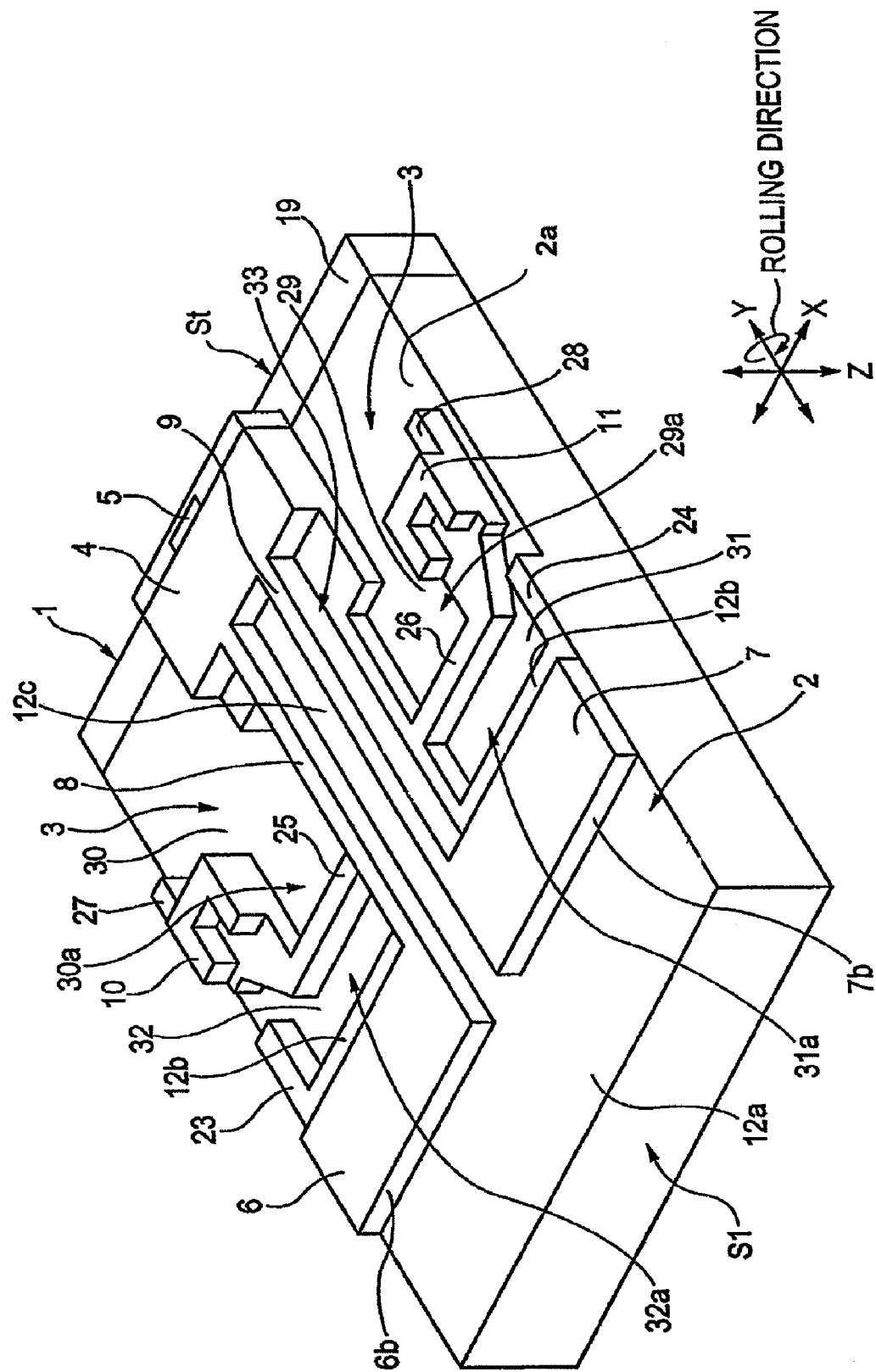
FIG. 1 is a perspective view turning up and illustrating the face of a magnetic head slider according to a first embodiment facing a disk.
Figure 2:
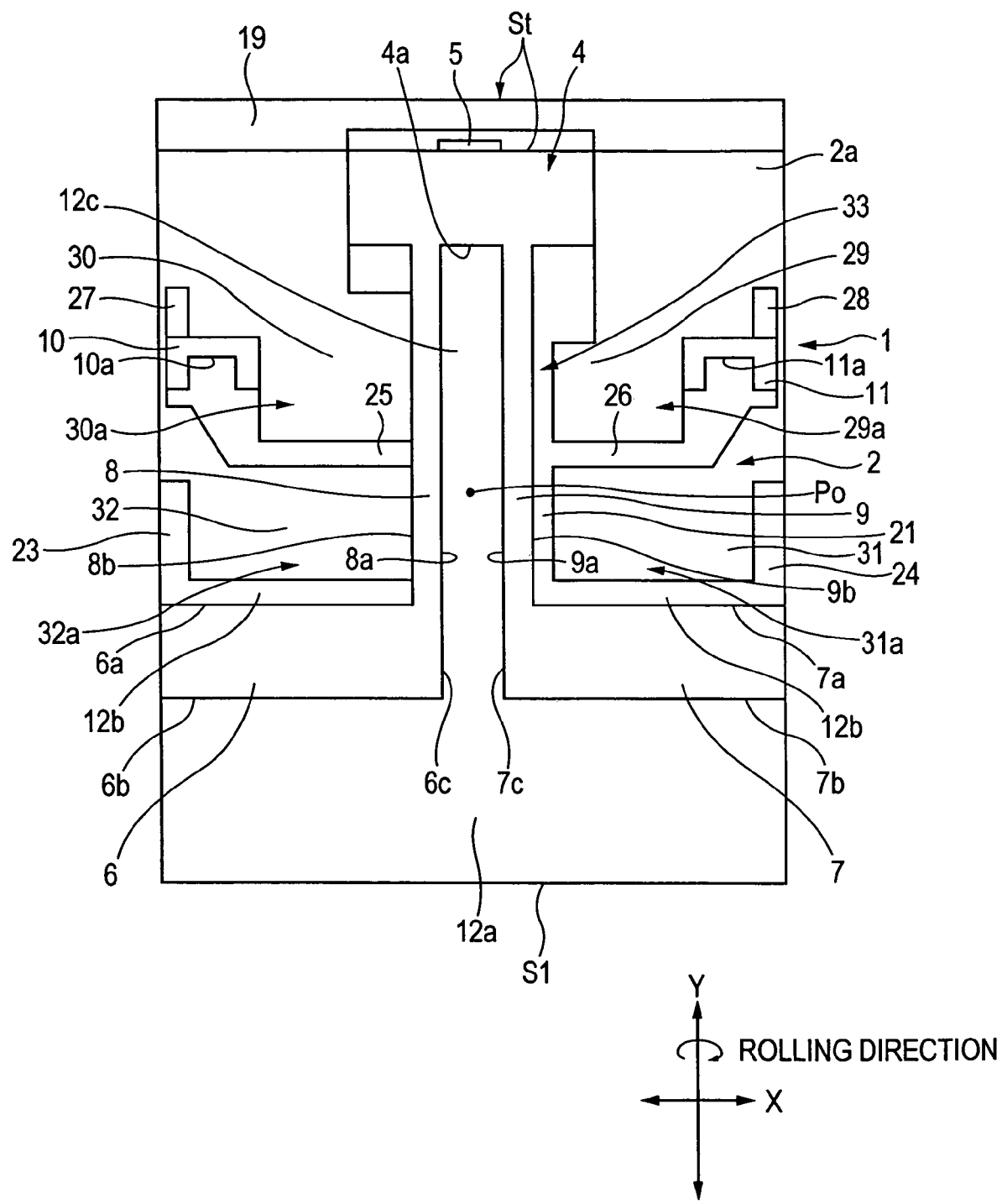
FIG. 2 is a plane view of the magnetic head slider shown in FIG. 1 as viewed from the face facing the disk side.
Figure 3:
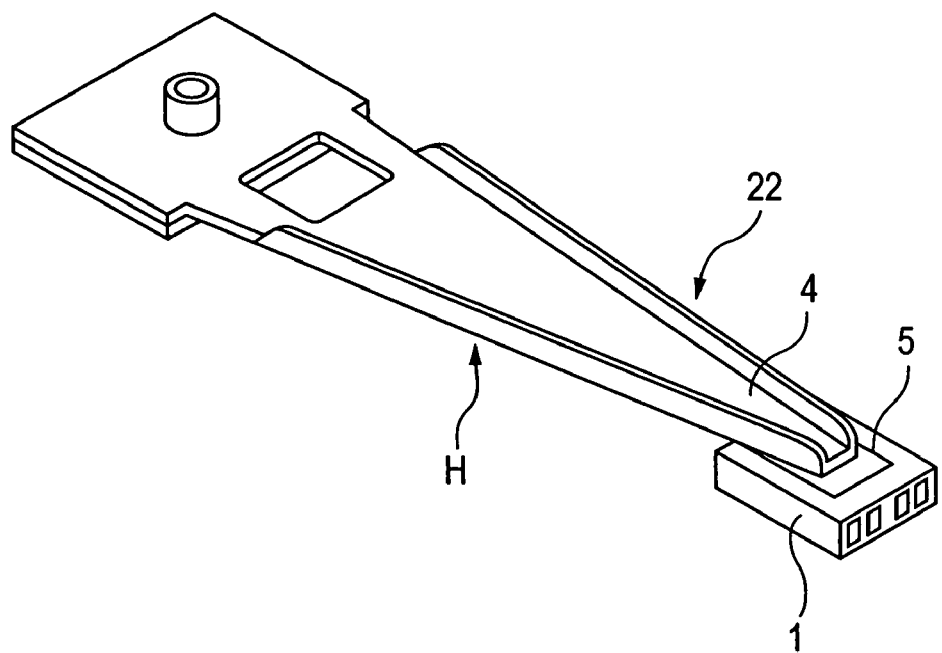
FIG. 3 is a fragmentary perspective view of a magnetic head device in which the magnetic head slider is attached to a support member.
Figure 4:
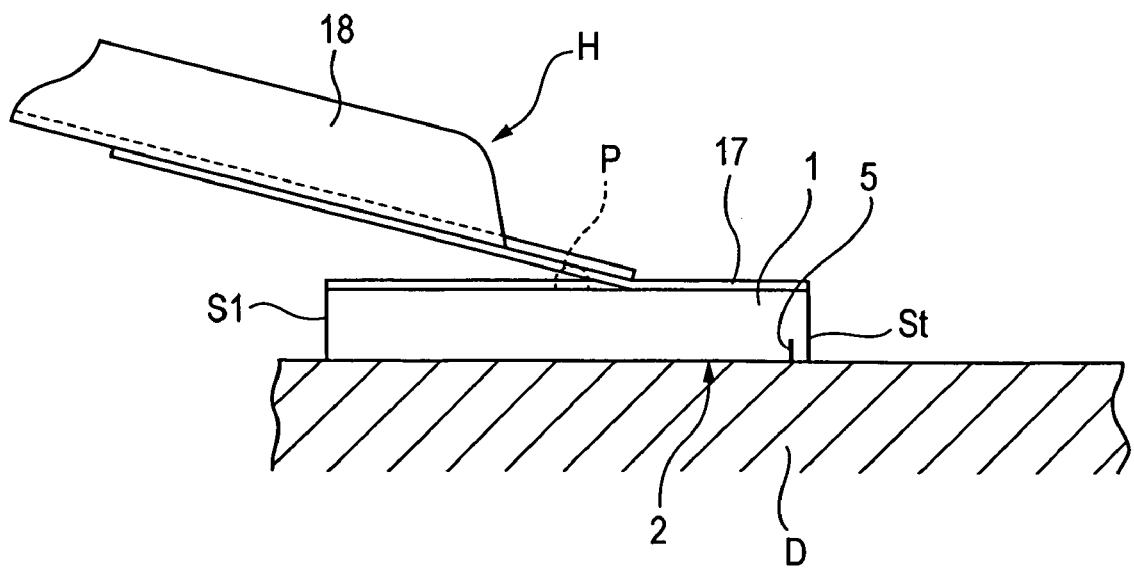
FIG. 4 is a fragmentary side view of a magnetic disk device illustrating a state in which the magnetic head slider according to the present invention is stopped over a magnetic disk.
Figure 5:
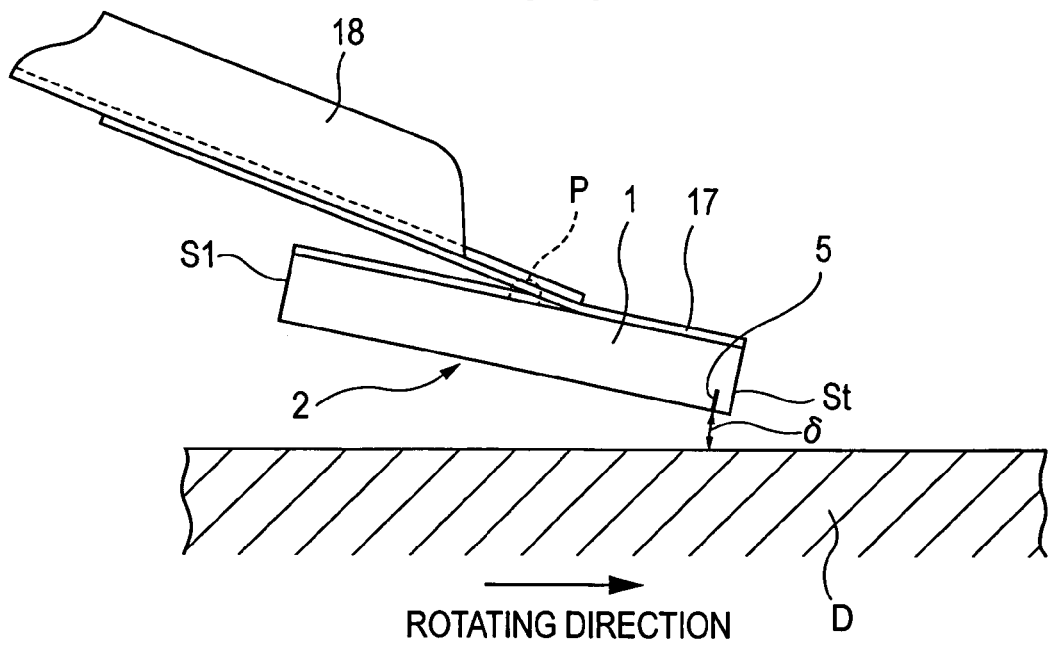
FIG. 5 is a fragmentary side view of a magnetic disk device illustrating a state following the magnetic head slider according to the present invention flying from the magnetic disk.
Figure 6:
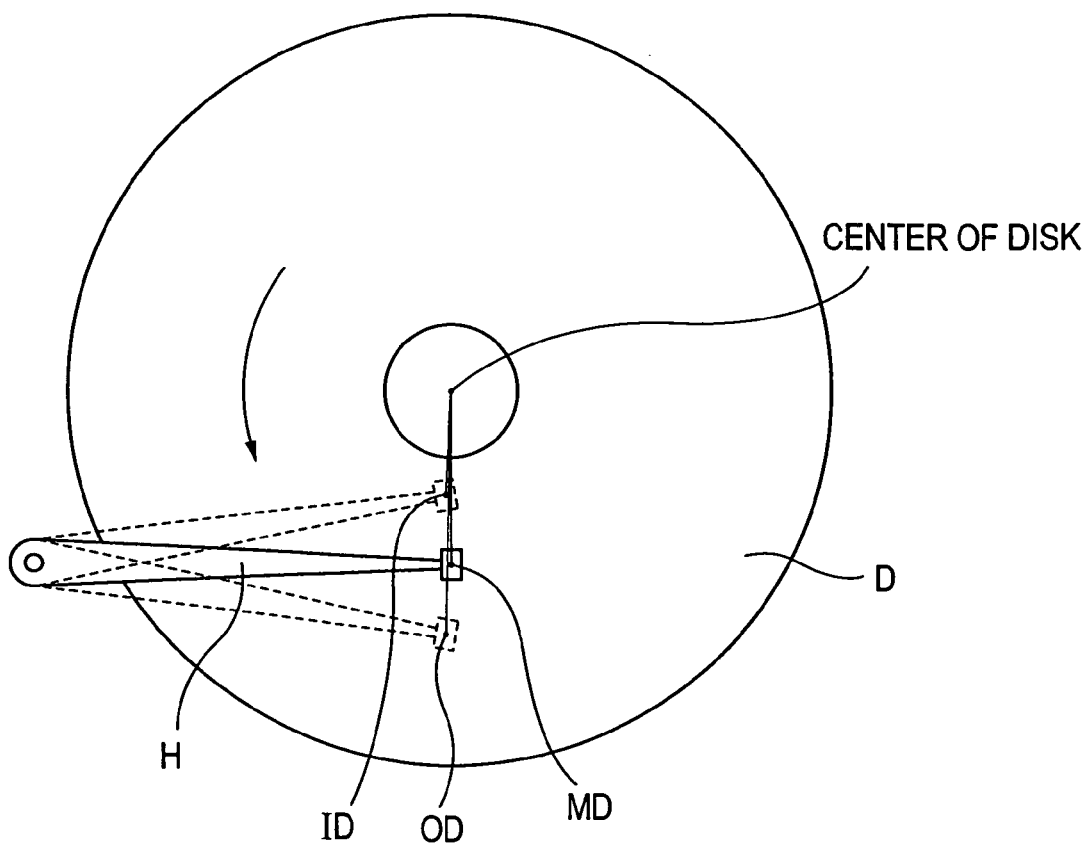
FIG. 6 is a plane view of the magnetic head device and the magnetic disk.
Figure 7:
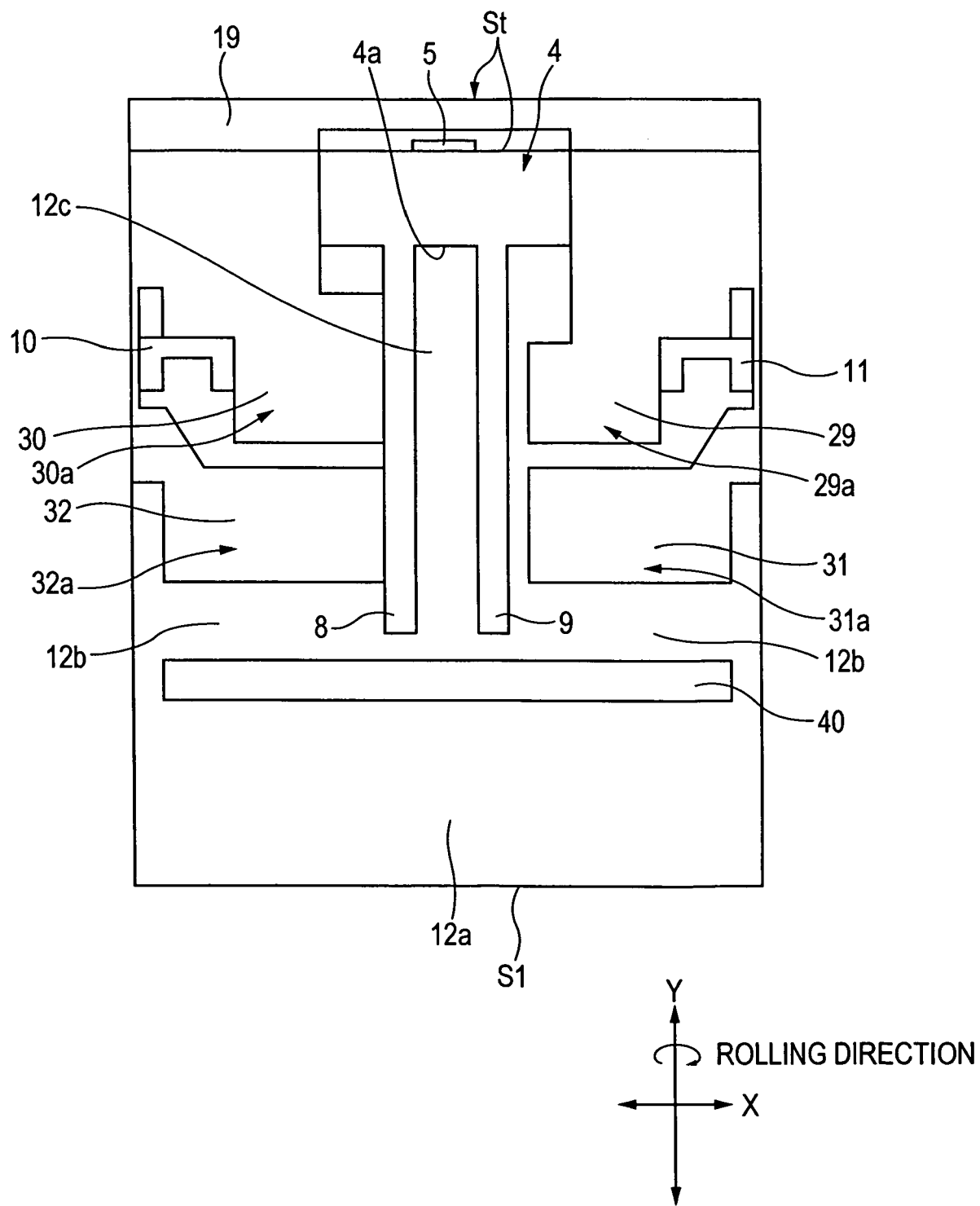
FIG. 7 is a plane view turning up and illustrating the face of a magnetic head slider according to a second embodiment facing a disk.
Figure 8:
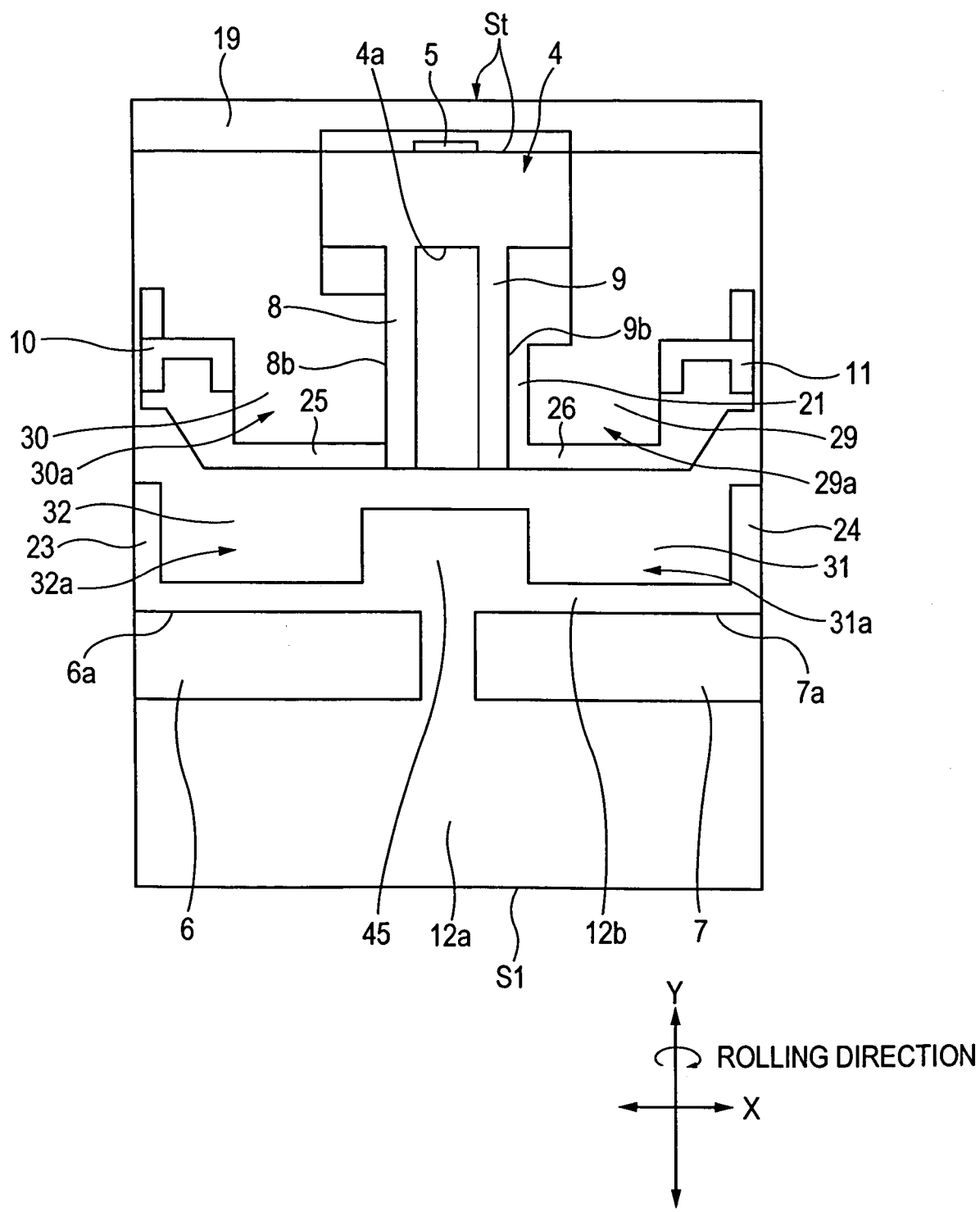
FIG. 8 is a plane view turning up and illustrating the face of a magnetic head slider according to a third embodiment facing a disk.
Figure 9:
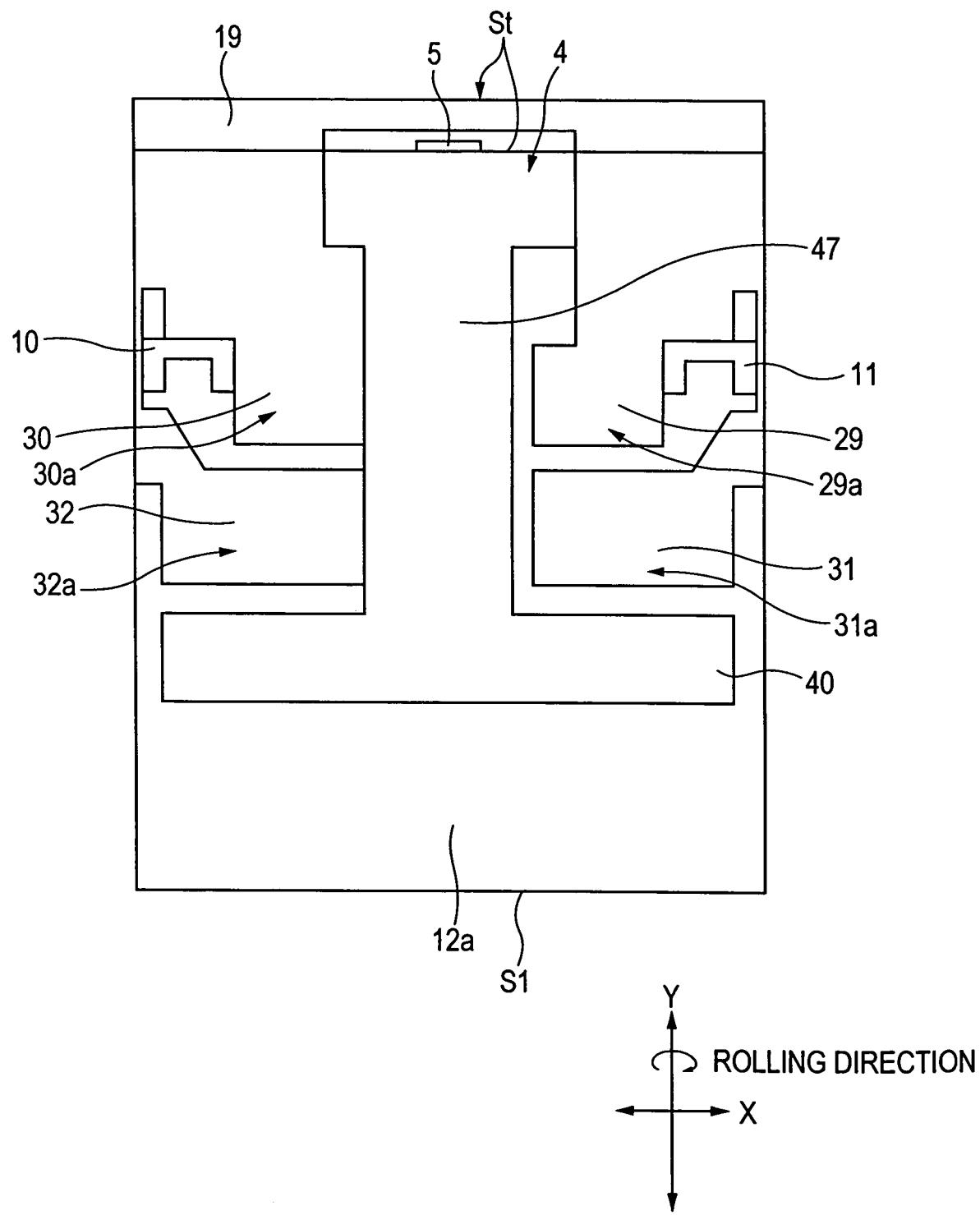
FIG. 9 is a plane view turning up and illustrating the face of a magnetic head slider according to a fourth embodiment facing a disk.

FIG. 1 a perspective view turning up and illustrating the face of a magnetic head slider of a first embodiment facing a disk, FIG. 2 is a plane view of the magnetic head slider shown in FIG. 1 as viewed from the face facing the disk, FIG. 3 is a fragmentary perspective view of a magnetic head device in which the magnetic head slider is attached to a support member, FIG. 4 is a fragmentary side view of a magnetic disk device illustrating a state in which the magnetic head slider according to the present invention is stopped over a magnetic disk, FIG. 5 is a fragmentary side view of a magnetic disk device illustrating a state following the magnetic head slider according to the present invention flying from the magnetic disk, FIG. 6 is a plane view of the magnetic head device and the magnetic disk, FIG. 7 is a plane view turning up and illustrating the face of a magnetic head slider according to a second embodiment facing a disk, FIG. 8 is a plane view turning up and illustrating the face of a magnetic head slider according to a third embodiment facing a disk, and FIG. 9 is a plane view turning up and illustrating the face of a magnetic head slider according to a fourth embodiment facing a disk.

The magnetic head slider 1 shown in FIGS. 1 and 2 makes up a part of a magnetic head device H. The magnetic head slider 1, as shown in FIG. 3 for example, is attached to a support member 22 which elastically supports the magnetic head slider 1 from the reverse side of a face 2 facing a disk. The support member 22 includes a load beam 18 serving as a leaf spring, a flexure (elastic support member) 17 serving as a flat spring which is provided on the tip thereof (see FIG. 4).

The magnetic head device H, which is mounted within a magnetic disk device, has functions for recording a magnetic signal in a magnetic disk D provided within the magnetic disk device, and reproducing the magnetic signal recorded in the magnetic disk D.

FIG. 4 illustrates a state in which the magnetic head slider 1 making up the magnetic head device H is stopped over the magnetic disk D provided within the magnetic disk device. The magnetic head slider 1 flies over the magnetic disk D by the magnetic disk D being rotated from the stopped state shown in FIG. 4, and the above recording or reproduction is performed (FIG. 5).

As shown in FIG. 4, the magnetic head slider 1 is bonded and fixed to the underface of the flexure 17 from the reverse side of the face 2 facing the disk. As shown in FIG. 4, a spherical-shaped pivot P protruding in the upward direction shown in the drawing is formed in the flexure 17, and the tip of this pivot P is in contact with the load beam 18.

With the state in FIG. 4, the magnetic head slider 1 is pressed against the recording surface of the magnetic disk D with weak elastic force by the support member 22. As shown in FIG. 5, upon the magnetic disk D starting to rotate, a leading side end surface Si of the magnetic head slider 1 is uplifted upwards with the pivot P serving as an oscillating supporting point by receiving air flow. Upon the magnetic head slider 1 flying over the magnetic disk D, the magnetic head slider 1 is oscillated in the pitch direction with the pivot P serving as an oscillating supporting point so as to follow swell of the magnetic disk D. As shown in FIG. 5, the magnetic head slider 1 flies over the magnetic disk D with a flying height δ. Hereinafter, when referring to as "flying height", as shown in FIG. 5, this is represented with distance in a straight line (minimum distance) from the surface of a magnetic element 5 to the surface of the magnetic disk D.

As shown in FIGS. 1 and 2, the air inflow end of the magnetic head slider 1 is referred to as "leading side end surface S1", and the air outflow end thereof is referred to as "trailing side end surface St". Also, hereinafter, "direction facing the leading side end surface, or close to the leading side end surface" is referred to as simply "leading side S1", and "direction facing the trailing side end surface, or close to the trailing side end surface" is referred to as simply "trailing side St" without showing the side end surfaces themselves. Also, hereinafter, the direction toward the trailing side end surface St from the leading side end surface S1 is taken as the vertical direction, and the direction intersecting with the vertical direction as the lateral direction. The vertical direction is identical to the Y direction shown in FIGS. 1 and 2. Also, the X direction shown in the drawing is one of the lateral direction, but the X direction is the direction orthogonal to the Y direction, and accordingly, the "lateral direction" according to the present embodiment is not always restricted to the X direction orthogonal to the Y direction. The lateral direction means the direction crossing with the vertical direction (Y direction shown in the drawing), so this concept is wider than "orthogonal". However, hereinafter, for the sake of explanatory convenience, description will be made as the lateral direction (X direction in the drawing).

The magnetic head slider 1 shown in FIGS. 1 and 2 is made up of, for example, alumina titanium carbide or the like.

As shown in FIGS. 1 and 2, a magnetic element face 4 raised and formed from the bottom face 2a of the face 2 facing the disk (the term "bottom face" means the surface present in the lowest position of the face 2 facing the disk in a state in which the face 2 facing the disk is turned up as shown in FIGS. 1 and 2) is formed in the direction of the magnetic disk D on the trailing side St on the face 2 of the magnetic head slider 1 facing the disk. As shown in FIGS. 1 and 2, the magnetic element 5 is formed on the trailing side end surface St of the magnetic head slider 1, and is, for example, a compound element of an MR element for reproduction, which is represented by a spin-valve-type thin-film element using magneto-resistance effects, and an inductive element for recording, or is made up of only one of the MR element and the inductive element. As shown in FIGS. 1 and 2, the circumference of the magnetic element 5 is covered with a protective film 19 such as $Al_2O_3$, and the protective film 19 also makes up a part of the magnetic element face 4.

The surface of the magnetic element 5 is exposed from the magnetic element face 4, and the magnetic element 5 is used for recording and reproduction as to the magnetic disk D, as described above.

As shown in FIGS. 1 and 2, leading side raised faces (air inflow end side raised faces) 6 and 7, which are raised and formed from the bottom face 2a of the face 2 facing the disk, and also divided into two blocks and formed toward the lateral direction (X direction in the drawing), are provided on the leading side S1 of the magnetic head slider 1 with the same height as the magnetic element face 4.

Further, as shown in FIGS. 1 and 2, rail faces 8 and 9 formed with the same height dimension as the magnetic element face 4 and the leading side raised faces 6 and 7 are raised and formed from the bottom face 2a of the face 2 facing the disk between each of the trailing side end portions 6a and 7a of the leading side raised faces 6 and 7 and the leading side end portion 4a of the magnetic element face 4, and each of the leading side raised faces 6 and 7 is connected with the magnetic element face 4 through the rail faces 8 and 9.

As shown in FIGS. 1 and 2, side-raised faces 10 and 11 having the same height as the magnetic element face 4 are raised and formed from the bottom face 2a of the face 2 facing the disk on both sides in the lateral direction (X direction in the drawing) of the rail faces 8 and 9. When the magnetic head slider 1 is inclined in the rolling direction (direction rotating around the Y direction shown in the drawing serving as an axis) over the magnetic disk D, the side-raised faces 10 and 11 serve as positive pressure generating faces for preventing the angle to be inclined as to the surface of the magnetic disk D, and preventing both side end portions in the X direction shown in the drawing of the magnetic head slider 1 from collision over the magnetic disk D, and the like. As shown in FIGS. 1 and 2, the planar shapes of the side-raised faces 10 and 11 are formed in a general U-character shape, and are shapes wherein the open ends face the leading side S1, but are not restricted to such a shape. For example, the planar shapes of the side-raised faces 10 and 11 may be V-like shapes. However, the planar shapes of the side-raised faces 10 and 11 are preferably formed in an enclosing shape of which open end faces the leading side S1, whereby the tilt of the magnetic head slider 1 in the rolling direction can be appropriately suppressed.

The magnetic element face 4, leading side raised faces 6 and 7, and rail faces 8 and 9, which are positioned in the same height position as the side-raised faces 10 and 11, are also positive pressure generating faces as with the side-raised faces 10 and 11.

Next, description will be made regarding a face lower one step than the magnetic element face 4. As shown in FIGS. 1 and 2, a leading side step face 12a having a very wide area is formed from the leading side end portions 6b and 7b of the leading side raised face 6 and 7 to the leading side end portion S1. The leading side step face 12a is formed with a height higher than the bottom face 2a of the face 2 facing the disk but lower than the leading side raised faces 6 and 7.

Further, a trailing side step face 12b having a small width dimension is formed toward the trailing side St from the trailing side end portions 6a and 7a of the leading side raised faces 6 and 7 with the same height as the leading side step face 12a. Also, as shown in FIGS. 1 and 2, a center step face 12c having the same height as the leading side step face 12a is formed from between the inner side end portions 6c and 7c of the leading side raised faces 6 and 7 to between the inner side end portions 8a and 9a of the rail faces 8 and 9. Note that the center step face 12c is not restricted to the same height as the leading side step face 12a, also even if the center step face 12c has an uneven height, an arrangement wherein a part of height differs from the heights of the other portions is also encompassed in the present embodiment. However, the entire center step face 12c is preferably formed with the same height as the leading side step face 12a.

Also, as shown in FIGS. 1 and 2, a rail lateral step face 21 which links the trailing side step face 12b and the leading side end portion 4a of the magnetic element face 4 is formed with the same height as the leading side step face 12a in the right-side end portion 9b (outside end portion) of the rail face 9. The rail lateral step 21 may not be formed. Also, the rail lateral step face may be formed in the left-side end portion 8b of the rail face 8. Note that hereinafter, the rail faces 8 and 9, center step face 12c, and rail lateral step face 21 are collectively referred to as a "center linking face 33" which links the leading side raised faces 6 and 7 and the magnetic element face 4.

Further, as shown in FIGS. 1 and 2, side-extended faces 23 and 24 extending toward the trailing side St are formed with the same height as the leading side step face 12a on both sides in the lateral direction (X direction in the drawing) of the trailing side step face 12b.

As shown in FIG. 2, between the side-raised faces 10 and 11 and the center linking face 33 is linked with side-linking faces 25 and 26. The side-linking faces 25 and 26 are formed with the same height as the leading side step face 12a. The side-linking faces 25 and 26 are connected with the leading side end portions 10a and 11a of the side-raised faces 10 and 11. Also, the side-linking faces 25 and 26 are formed closer to the trailing side St than the center Po of the pivot P. The position of the center Po of the pivot P shown in FIG. 2 is a position where the center Po of the pivot P in contact on the reverse side of the face 2 facing the disk is traced in the film-thickness direction of the slider 1 (Z direction in the drawing).

Also, as shown in FIGS. 1 and 2, extended faces 27 and 28 are formed toward the trailing side St direction from the trailing side end portions 10b and 11b of the side-raised faces 10 and 11. The extended faces 27 and 28 are formed with the same height as the leading side step face 12a.

As described above, the leading side step face 12a, trailing side step face 12b, rail lateral step face 21, side-extended faces 23 and 24, side-linking faces 25 and 26, and extended faces 27 and 28 are all formed with the same height, these faces are not provided particularly as faces generating positive pressure or negative pressure, but provided for facilitating the air to be guided toward the air outflow of the trailing side St from the air inflow end of the leading side S1, and the like.

As shown in FIGS. 1 and 2, first groove portions 29 and 30 surrounded with the center-linking face 33, side-linking faces 25 and 26, and side-raised faces 10 and 11 are formed on both sides in the lateral direction (X direction in the drawing) of the center-linking face 33 on the trailing side St of the slider 1. Hereinafter, the groove portion of reference numeral 29 is referred to as a first right-side groove portion, and the groove portion of reference numeral 30 is referred to as a first left-side groove portion.

Second groove portions 31 and 32, which are positioned closer to the leading side S1 than the first right-side groove portion 29 and first left-side groove portion 30, surrounded with the center-linking face 33, trailing side step face 12b, and side-extended faces 23 and 24 are formed on both sides in the lateral direction (X direction in the drawing) of the center-linking face 33. Hereinafter, the groove portion of reference numeral 31 is referred to as a second right-side groove portion, and the groove portion of reference numeral 32 is referred to as a second left-side groove portion.

Each of the bottom faces 29a, 30a, 31a, and 32a of the first right-side groove portion 29, first left-side groove portion 30, second right-side groove portion 31, and second left-side groove portion 32 is identical to the bottom face 2a of the face 2 facing the disk in height, and with the embodiment shown in FIGS. 1 and 2, these faces are in the lowest position when turning up the face 2 facing the disk such as shown in FIGS. 1 and 2. Each of the bottom faces 29a, 30a, 31a, and 32a of the first right-side groove portion 29, first left-side groove portion 30, second right-side groove portion 31, and second left-side groove portion 32 is a negative pressure generating face. The bottom face 29a is referred to as a first right-side negative pressure generating face 29a, the bottom face 30a is referred to as a first left-side negative pressure generating face 30a, the bottom face 31a is referred to as a second right-side negative pressure generating face 31a, and the bottom face 32a is referred to as a second left-side negative pressure generating face 32a.

With the present embodiment shown in FIGS. 1 and 2, as described above, the first right-side groove portion 29 and first left-side groove portion 30 are divided in the lateral direction (X direction in the drawing) and formed on the trailing side St of the slider 1, the second right-side groove portion 31 and second left-side groove portion 32 are divided in the lateral direction (X direction in the drawing) and formed closer to the leading side S1 than the first right-side groove portion 29 and first left-side groove portion 30, and the bottom face of each groove portion serves as a negative pressure generating face. The negative pressure (absolute value) generated at the first right-side negative pressure generating face 29a and first left-side negative pressure generating face 30a is greater than the negative pressure (absolute value) generated at the second right-side negative pressure generating face. 31a and second left-side negative pressure generating face 32a. Here, the term "the negative pressure (absolute value) generated at the first right-side negative pressure generating face 29a and first left-side negative pressure generating face 30a" means the sum of the negative pressure generated at each of the first right-side negative pressure generating face 29a and first left-side negative pressure generating face 30a. Similarly, the term "the negative pressure (absolute value) generated at the second right-side negative pressure generating face 31a and second left-side negative pressure generating face 32a" means the sum of the negative pressure generated at each of the second right-side negative pressure generating face 31a and second left-side negative pressure generating face 32a. The same as the above is applied to the following. Note that the relationships are preferable wherein the negative pressure (absolute value) generated at the first right-side negative pressure generating face 29a is greater than the negative pressure (absolute value) generated at each of the second right-side negative pressure generating face 31a and second left-side negative pressure generating face 32a, and similarly, the negative pressure (absolute value) generated at the first left-side negative pressure generating face 30a is greater than the negative pressure (absolute value) generated at each of the second right-side negative pressure generating face 31a and second left-side negative pressure generating face 32a.

Thus, negative pressure is effectively generated on the trailing side St, positive pressure and negative pressure are kept particularly on the trailing side St in a well-balanced manner, and fluctuation of flying height due to change in atmospheric pressure can be suppressed. Also, small negative pressure is generated at the second right-side negative pressure generating face 31a and second left-side negative pressure generating face 32a closer to the leading side S1 than the first right-side negative pressure generating face 29a and first left-side negative pressure generating face 30a, and moreover, the first right-side negative pressure generating face 29a and first left-side negative pressure generating face 30a, and the second right-side negative pressure generating face 31a and second left-side negative pressure generating face 32a are each divided in the lateral direction (X direction in the drawing) and formed, whereby negative pressure and positive pressure can be kept in a well-balanced manner even in the event of the flying position of the magnetic head slider 1 over the magnetic disk D being changed in the radial direction of the magnetic disk D as shown in FIG. 6, and the skew angle thereof being changed, and accordingly, fluctuation of flying height due to change in the skew angle over the magnetic disk D can be reduced as well as fluctuation of flying height due to change in atmospheric pressure.

As shown in FIGS. 1 and 2, each of the first right-side groove portion 29 and first left-side groove portion 30 has a shape surrounded with the center-linking face 33, side-linking faces 25 and 26, and side-raised faces 10 and 11, so the bottom faces of the first right-side groove portion 29 and first left-side groove portion 30 serve as the negative generating faces 29a and 30a which generate negative pressure effectively, and particularly, the first right-side negative pressure generating face 29a and first left-side negative pressure generating face 30a are formed in a shape long in the vertical direction (Y direction) as compared with the second right-side groove portion 31 and second left-side groove portion 32, thereby generating great negative pressure.

On the other hand, each of the second right-side groove portion 31 and second left-side groove portion 32 has a shape surrounded with the center-linking face 33, trailing side step face 12b, side-extended faces 23 and 24, so the bottom faces of the second right-side groove portion 31 and second left-side groove portion 32 serve as negative pressure generating faces which generate negative pressure. However, since the lengths in the vertical direction (Y direction in the drawing) of the side-extended faces 23 and 24 are not sufficiently long, the groove portions 31 and 32 are not sufficiently surrounded, the leading side raised faces 6 and 7 in contact on the second right-side negative pressure generating face 31*a* and second left-side negative pressure generating face 32*a* generate very large positive pressure, and so forth, the negative pressure (absolute value) generated at the second right-side negative pressure generating face 31*a* and second left-side negative pressure generating face 32*a* is small as compared with the negative pressure (absolute value) generated at the first right-side negative pressure generating face 29*a* and first left-side negative pressure generating face 30*a*.

Also, with the present invention shown in FIGS. 1 and 2, between each of the trailing side end portions 6*a* and 7*a* of the leading side raised faces 6 and 7, and the leading side end portion 4*a* of the magnetic element face 4 is connected with the rail faces 8 and 9 raised and formed with the same height as the magnetic element face 4 and leading side raised faces 6 and 7, and also the center step face 12*c* having a height dimension lower than the magnetic element face 4 but higher than the bottom face 2*a* is provided between the leading side raised faces 6 and 7, and between the rail faces 8 and 9.

Thus, between the magnetic element face 4 and the leading side raised faces 6 and 7 is connected with the rail faces 8 and 9 having the same height as the magnetic element face 4 and the leading side raised faces 6 and 7, thereby facilitating guiding of the air compressed at the leading side raised faces 6 and 7 on the air inflow end side to the magnetic element face 4 through the same planar rail faces 8 and 9 and the center step face 12*c* without barriers such as steps, whereby the air can be collected in the magnetic element face 4 effectively, even if the amount of air inflow is reduced due to change in atmospheric pressure or the like, and also positive pressure having suitable magnitude can be generated.

Also, the air flow in the center step face 12*c* provided between the leading side raised faces 6 and 7, and between the rail faces 8 and 9 flows to the magnetic element face 4 smoothly by the inflow direction thereof being appropriately restricted with the tall leading side raised faces 6 and 7 and rail faces 8 and 9 positioned on both sides in the X direction in the drawing.

As shown in FIG. 2, inner side end portions 8*a* and 9*a* face each other in the X direction shown in the drawing. The rail faces 8 and 9 are continuously formed with inner side end portions 6*c* and 7*c* facing each other in the X direction shown in the drawing of the leading side raised faces 6 and 7, so the air flow in the center step face 12*c* is guided to the magnetic element face 4 smoothly.

Note that in FIGS. 1 and 2, the rail faces 8 and 9 are formed in parallel, but are not restricted to such an arrangement.

Also, the area obtained by adding the areas of the leading side raised faces 6 and 7 is greater than the area of the magnetic element face 4. As described in FIG. 5, with the magnetic head slider 1, in order to take tilt bearing in which the leading side end surface S1 flies higher than the trailing side end surface St when flying, so it is necessary for the leading side S1 of the magnetic head slider 1 to receive positive pressure stronger than the trailing side St. Accordingly, the area obtained by adding the areas of the leading side raised faces 6 and 7 serving as positive pressure generating faces is formed greater than the area of the magnetic element face 4.

FIGS. 7 through 9 are modifications wherein a part of the face 2 of the slider 1 according to the embodiment shown in FIGS. 1 and 2 facing the disk is modified.

In any of FIGS. 7 through 9, as with FIGS. 1 and 2, the first right-side groove portion 29 and first left-side groove portion 30 are divided in the lateral direction (X direction shown in the drawing) and formed on the trailing side St of the slider 1, and the second right-side groove portion 31 and second left-side groove portion 32 are divided in the lateral direction (X direction shown in the drawing) and formed closer to the leading side S1 of the slider 1 than the first right-side groove portion 29 and first left-side groove portion 30, and the bottom face of each groove portion is taken as a negative pressure generating face. Further, FIGS. 7 through 9 are common in that the negative pressure (absolute value) generated at the first right-side negative pressure generating face 29*a* and first left-side negative pressure generating face 30*a* is arranged so as to be greater than the negative pressure (absolute value) generated at the second right-side negative pressure generating face 31*a* and second left-side negative pressure generating face 32*a*.

Thus, even with the embodiments shown in FIGS. 7 through 9, negative pressure is effectively generated on the trailing side St, and positive pressure and negative pressure are kept in a well-balanced manner particularly on the trailing side St, whereby fluctuation of flying height due to change in atmospheric pressure can be suppressed. Also, even in the event of change in skew angle, positive pressure and negative pressure are kept in a well-balanced manner, and fluctuation of flying height due to change in the skew angle can be suppressed.

With the embodiment shown in FIG. 7, only one leading side raised face 40 is formed. The rail faces 8 and 9 shown in FIG. 7 are not connected to the leading side raised face 40, but may be connected thereto. As compared with the embodiment shown in FIGS. 1 and 2, the embodiment shown in FIG. 7 may have disturbance in air flow which flows from a leading side step face 12*a* to a center step face 12*c*, or reduction of air quantity, but as compared with the conventional magnetic head slider such as shown in Japanese Unexamined Patent Application Publication No. 10-283622, the embodiment shown in FIG. 7 can suppress fluctuation of flying height due to change in atmospheric pressure, and fluctuation of flying height due to change in the skew angle small.

With the embodiment shown in FIG. 8, unlike the embodiment shown in FIGS. 1 and 2, the magnetic element face 4 is not linked with leading side raised faces 6 and 7. In FIG. 8, the rail faces 8 and 9 connected to the magnetic element face 4 are formed extending to the leading side S1, but are not connected to the leading side raised faces 6 and 7, and are disconnected on the way thereto. Also, the rail lateral step face 21 is not connected to the leading side raised face 7, and is disconnected on the way thereto. The rail faces 8 and 9 and the rail lateral step face 21 shown in FIG. 8 make up a "first extended face" extending to the leading side S1 from the magnetic element face 4.

As shown in FIG. 8, the side-raised faces 10 and 11 are linked with the first extended face through side-linking faces 25 and 26, and a first right-side negative pressure generating face 29*a* and first left-side negative pressure generating face 30*a* are formed on the bottom faces of a first right-side groove portion 29 and first left-side groove portion 30 which are surrounded with side-raised faces 10 and 11, first extended face, and side-linking faces 25 and 26.

In FIG. 8, a trailing side step face 12*b* is formed toward the trailing side St from the trailing side end portions 6*a* and 7*a* of the leading side raised faces 6 and 7, side-extended faces 23 and 24 are formed extending toward the trailing side St from both sides in the X direction shown in the drawing of the trailing side step face 12*b*. Further, a center-extended face 45 is formed and extended from the trailing side step face 6 at the position just facing the first extended face in the length direction (Y direction in the drawing) between the side-extended faces 23 and 24 as shown in FIG. 8. With the embodiment shown in FIG. 8, a first right-side negative pressure generating face 31a and first left-side negative pressure generating face 32a are formed on the bottom faces of a second right-side groove portion 31 and second left-side groove portion 32 which are surrounded with the center extended face 45, trailing side step face 12b, and side-extended faces 23 and 24.

With the embodiment shown in FIG. 8, the magnetic element face 4 is not completely linked with the leading side raised faces 6 and 7, so as compared with the embodiment shown in FIGS. 1 and 2, the embodiment shown in FIG. 8 may have disturbance in air flow which flows from the leading side step face 12a to the magnetic element face 4, or reduction of air quantity, but as compared with the conventional magnetic head slider such as shown in Japanese Unexamined Patent Application Publication No. 10-283622, the embodiment shown in FIG. 8 can suppress fluctuation of flying height due to change in atmospheric pressure, and fluctuation of flying height due to change in skew angle small.

With the embodiment shown in FIG. 9, only one leading side raised face 40 is formed, as with FIG. 7. In FIG. 9, between the magnetic element face 4 and the leading side raised face 40 is linked with a linking face 47 formed with the same height as the magnetic element face 4 and the leading side raised face 40, which is not a shape linked with the two rail faces 8 and 9, and the center step face 12c formed between the rail faces 8 and 9 such as shown in FIG. 7. FIG. 9 is an embodiment wherein between the rail faces 8 and 9 shown in FIG. 7 is filled with the same height as the rail faces 8 and 9.

The magnetic head slider 1 of the embodiment shown in FIG. 9 may not be able to suppress both fluctuation of flying height due to change in atmospheric pressure and fluctuation of flying height due to change in skew angle small as compared with the magnetic head slider 1 of the embodiment shown in FIGS. 1 and 2, but can suppress fluctuation of flying height due to change in atmospheric pressure and fluctuation of flying height due to change in the skew angle small as compared with the conventional magnetic head slider such as Japanese Unexamined Patent Application Publication No. 10-283622.

EXAMPLES

We fabricated the magnetic head slider shown in FIGS. 1 and 2 (first embodiment).

In our experiments, we attached the above magnetic head slider to the support member 22 shown in FIG. 3, and flew it over the magnetic disk D as shown in FIG. 6. At this time, as shown in FIG. 6, we changed the position of the magnetic head slider over the magnetic disk D toward the radial direction from the center of the magnetic disk D, and measured the flying height of the magnetic head slider under the atmospheric pressure at a sea level (0 m), and the flying height of the magnetic head slider under the atmospheric pressure at high elevations (10 kft) at each experimental position where an experiment was performed.

Figure 12:
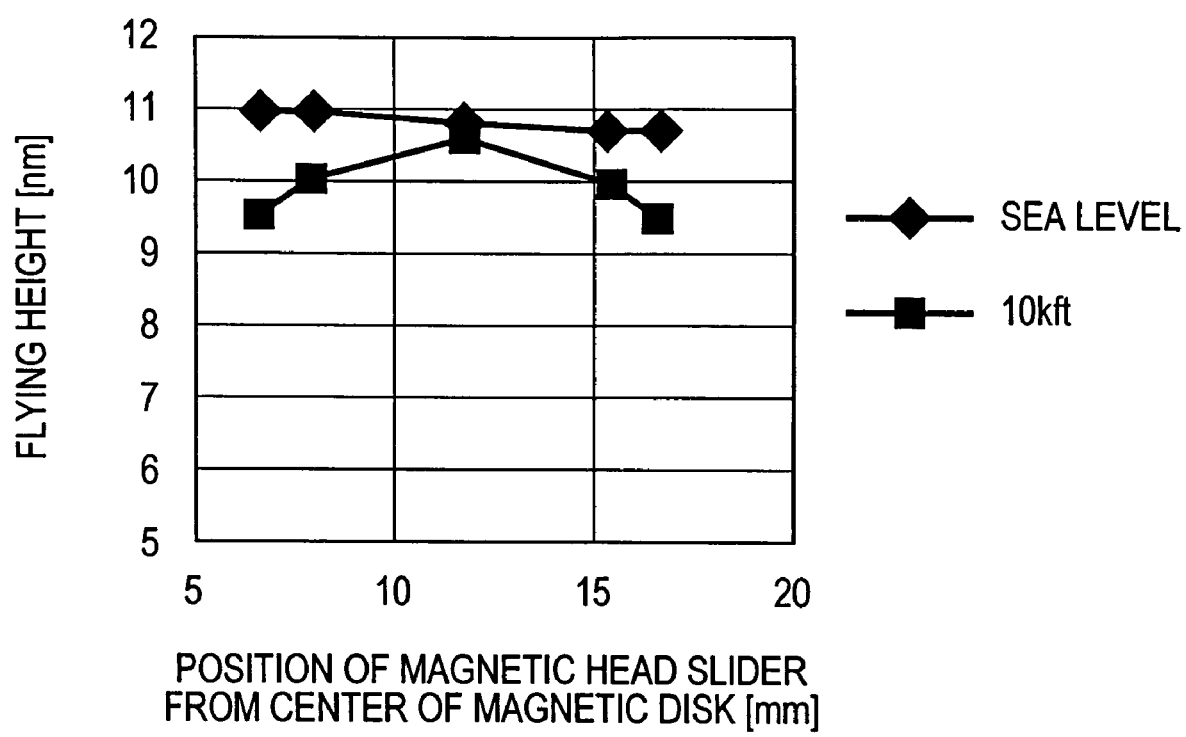
FIG. 12 is a graph illustrating, in the event of employing the magnetic head slider of an embodiment under each of the atmospheric pressure of high elevations (10 kft) and the atmospheric pressure at sea level, the relationships between a position of the magnetic head slider from the center of a magnetic disk and the flying height thereof.

The results thereof are shown in FIG. 12. We have recognized that as shown in FIG. 12, fluctuation of flying height as to the skew angle which is changed depending on the position of the magnetic head slider over the magnetic disk D being changed is very small under the atmospheric pressure at sea level (0 m). On the other hand, we have recognized that fluctuation in flying height as to change in skew angle under the atmospheric pressure at the high elevations (10 kft) is greater than that under the atmospheric pressure at the sea level, but both fluctuation in flying height due to change in atmospheric pressure and fluctuation in flying height as to change in the skew angle can be appropriately reduced as compared with the magnetic head slider of a comparative example shown in the following.

Figure 10:
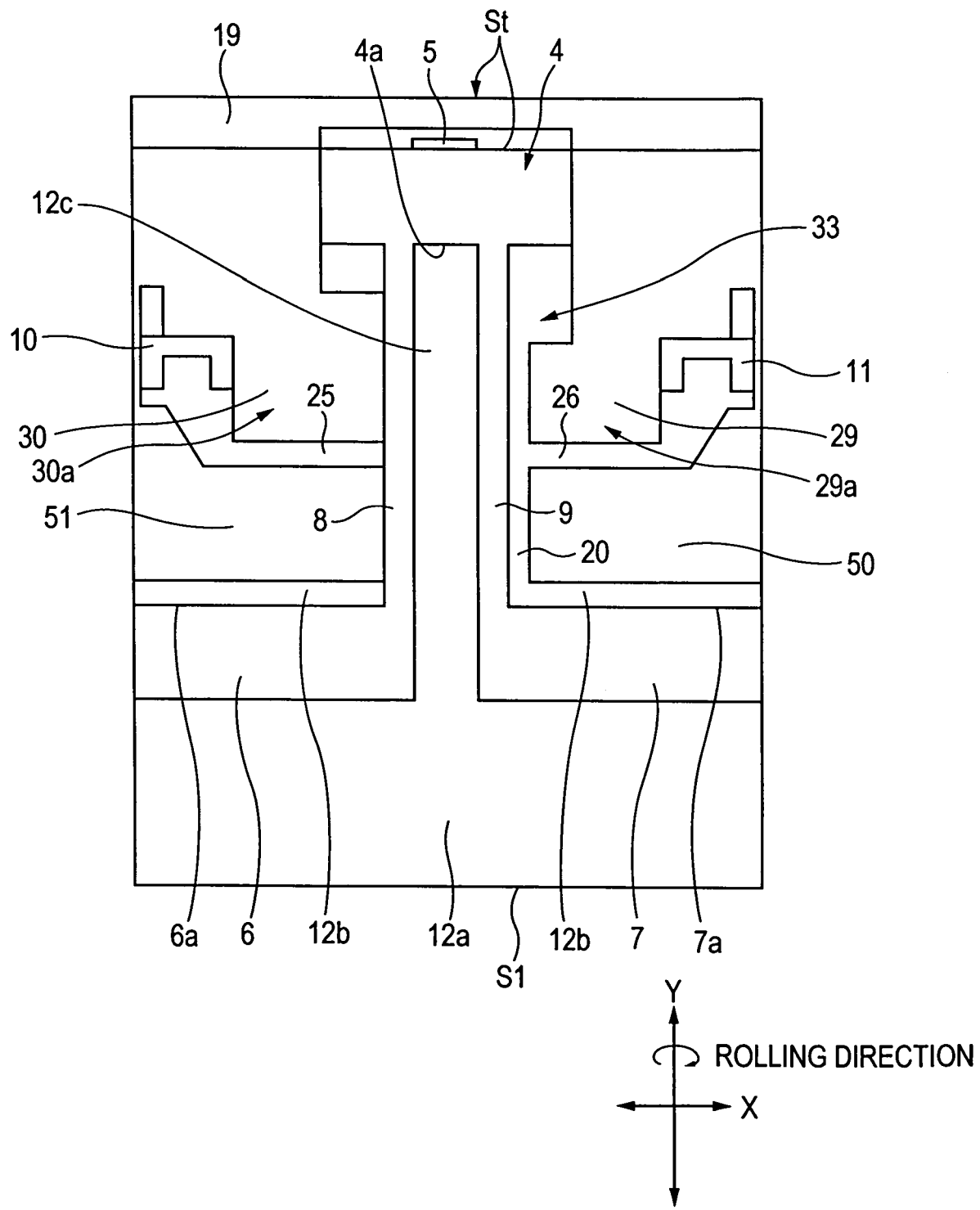
FIG. 10 is a plane view of the magnetic head slider of a comparative example 1 as viewed from the face facing a disk.

We fabricated the magnetic head slider shown in FIG. 10 as the magnetic head slider of a comparative example 1. When comparing the magnetic head slider in FIG. 10 with the magnetic head slider 1 shown in FIGS. 1 and 2, the side-extended faces 23 and 24 are not formed in the magnetic head slider in FIG. 10, unlike in FIGS. 1 and 2. As shown in FIG. 10, groove portions 50 and 51 are formed closer to the trailing side St than the trailing side step face 12b formed on the trailing side portions 6a and 7a of the leading side raised face 6 and 7, but we can consider that the bottom faces of the groove portions 50 and 51 do not serve as negative pressure generating faces. This is because the side-extended faces 23 and 24 are not formed, the air flowing into the groove portions 50 and 51 from the leading side S1 slips out of the slider from the groove portions 50 and 51, and as a result, we can consider that negative pressure is not generated at the groove portions 50 and 51. As described later, when fabricating the magnetic head slider having generally the same shape as FIG. 28 of Japanese Unexamined Patent Application Publication No. 10-283622, we have recognized that with the shape in FIG. 28 of Japanese Unexamined Patent Application Publication No. 10-283622, negative pressure is not generated at a groove portion between the land portion of reference numeral 5 and the dynamic-pressure generating portion of reference numeral 2b. With the shape in FIG. 28 of Japanese Unexamined Patent Application Publication No. 10-283622, as with FIG. 10, side-extended faces are not formed in the groove portion. Accordingly, in order to generate negative pressure at the bottom face of the groove portion appropriately, it is desirable to form the groove portion in a shape surrounded with the leading side S1 and both sides in the lateral direction (X direction in the drawing).

However, with the magnetic head slider shown in FIG. 10, the bottom faces 29a and 30a of the groove portions 29 and 30 surrounded with the side-raised faces 10 and 11, side-linking faces 25 and 26, and center-linking face 33 serve as negative pressure generating faces, as with the magnetic head slider shown in FIGS. 1 and 2. That is to say, the magnetic head slider shown in FIG. 10 has the two negative pressure generating faces 29a and 30a. On the other hand, the magnetic head slider 1 shown in FIGS. 1 and 2 (first embodiment) has the four negative pressure generating faces 29a, 30a, 31a, and 32a in total. We attached the magnetic head slider shown in FIG. 10 (comparative example 1) and the magnetic head slider shown in FIGS. 1 and 2 (first embodiment) to the support member 22 shown in FIG. 3, and flew these over the magnetic disk D as shown in FIG. 6. At this time, as shown in FIG. 6, we measured the flying heights of the magnetic head sliders under the atmospheric pressure at sea level (0 m), and the flying heights of the magnetic head sliders under the atmospheric pressure of the high elevations (10 kft) at each of a position MD equivalent to generally the midpoint of the disk radius from the center of the magnetic disk D (11.63 mm from the center of the disk), a position ID on the inner side of the position MD (6.63 mm from the center of the disk), and a position OD on the outside of position MD (16.63 mm from the center of the disk). Subsequently, we obtained flying height ratios by dividing the flying height of the magnetic head slider under the atmospheric pressure of the high elevations by the flying height of the magnetic head slider under the atmospheric pressure at sea level (the flying height of the magnetic head slider at the high elevations/the flying height of the magnetic head slider at the sea level) regarding the magnetic head sliders of the embodiment and the comparative example 1. The experimental results are shown in FIG. 13.

Figure 13:
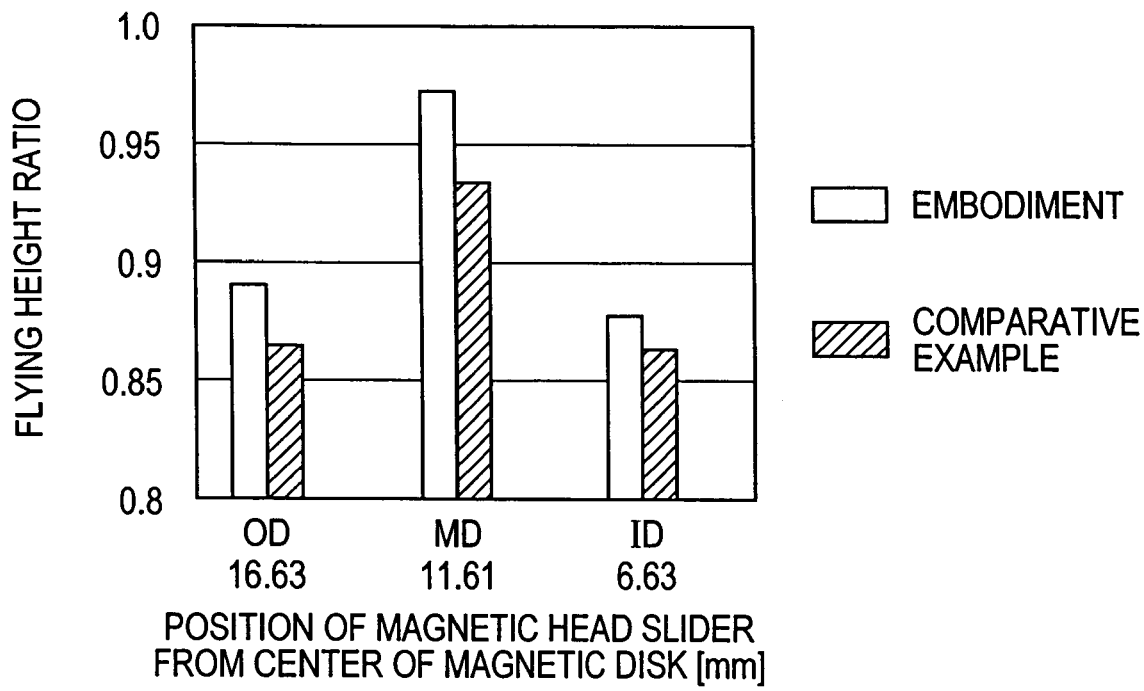
FIG. 13 is a graph illustrating, in the event of using the magnetic head slide of an embodiment and the magnetic head slider of a comparative example 1, the obtained flying height ratio (%) of the flying height of the magnetic head slider under the atmospheric pressure of high elevations (3048 m) as to the flying height of the magnetic head slider under the atmospheric pressure at sea level at each position of ID, MD, and OD over a magnetic disk D.

As shown in FIG. 13, we have recognized that the flying height ratio of the embodiment is greater than that of the comparative example 1. That is to say, we have recognized that the embodiment can reduce fluctuation of flying height due to change in atmospheric pressure as compared with the comparative example 1.

Figure 11:
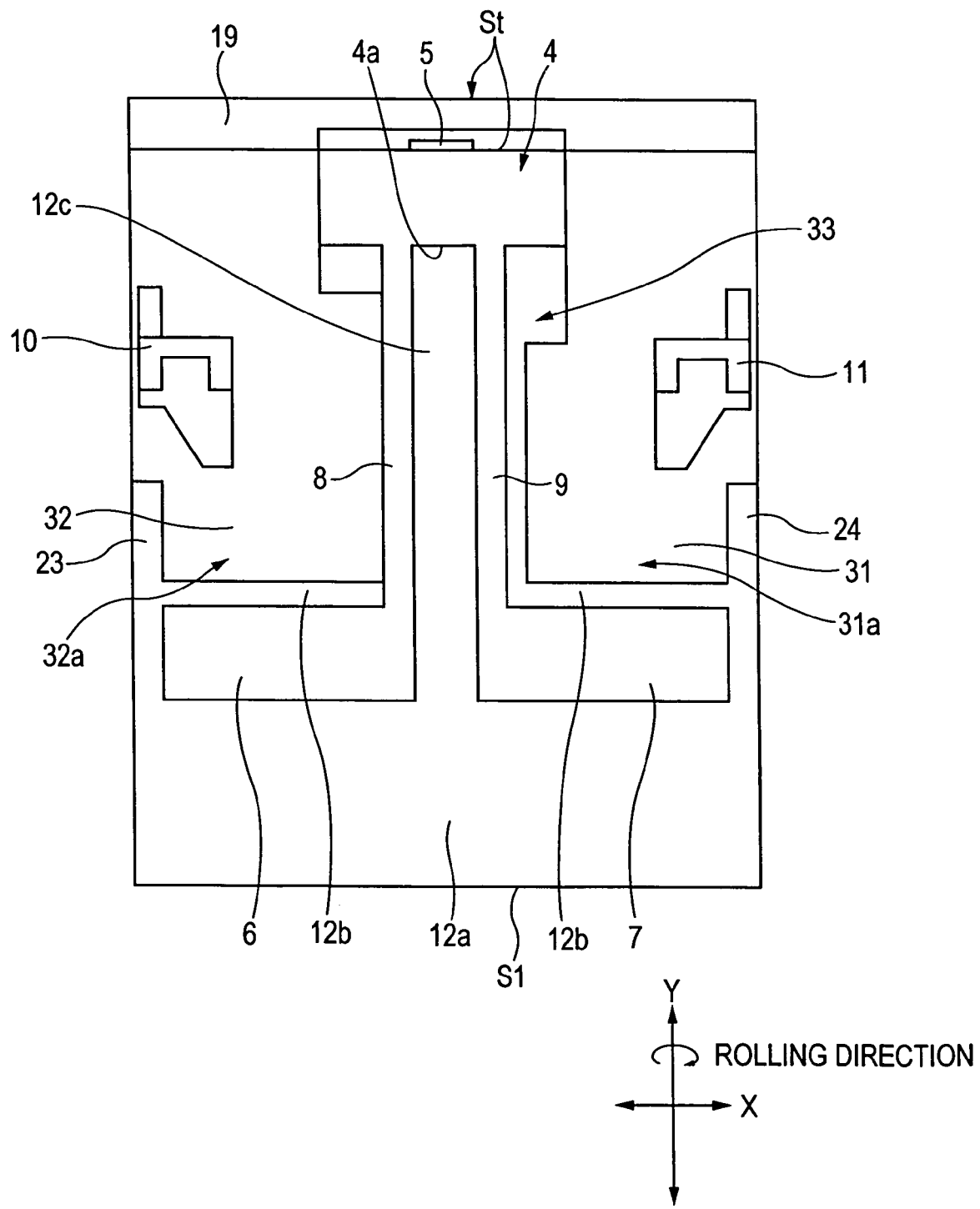
FIG. 11 is a plane view of the magnetic head slider of a comparative example 2 as viewed from the face facing a disk.

Next, we fabricated the magnetic head slider shown in FIG. 11 as the magnetic head slider of a comparative example 2. When comparing the magnetic head slider in FIG. 11 with the magnetic head slider shown in FIGS. 1 and 2, between the side-raised faces 10 and 11 and the center-linking face 33 is not linked by the side-linking faces 25 and 26 in the magnetic head slider in FIG. 11 unlike FIGS. 1 and 2. Accordingly, with the magnetic head slider shown in FIG. 11, the first right-side groove portion 29 and first left-side groove portion 30 shown in FIGS. 1 and 2 are not formed, and of course, the first right-side negative pressure generating face 29a and first left-side negative pressure generating face 30a are not formed as well. However, with the magnetic head slider shown in FIG. 11, as with the magnetic head slider shown in FIGS. 1 and 2, the groove portions 31 and 32 surrounded with the center-linking face 33, trailing side step face 12b, and side-extended faces 23 and 24 are formed, and the bottom faces 31a and 32a of the groove portions 31 and 32 serve as negative pressure generating faces.

Accordingly, the magnetic head slider shown in FIG. 11 (comparative example 2) has the two negative pressure generating faces 31a and 32a. On the other hand, the magnetic head slider 1 shown in FIGS. 1 and 2 (first embodiment) has the four negative pressure generating faces 29a, 30a, 31a, and 32a in total. We attached the magnetic head slider shown in FIG. 11 (comparative example 2) and the magnetic head slider shown in FIGS. 1 and 2 (first embodiment) to the support member 22 shown in FIG. 3, and flew these over the magnetic disk D as shown in FIG. 6. Subsequently, we measured flying height ratios based on the same conditions as the above. The results thereof are shown in FIG. 14.

Figure 14:
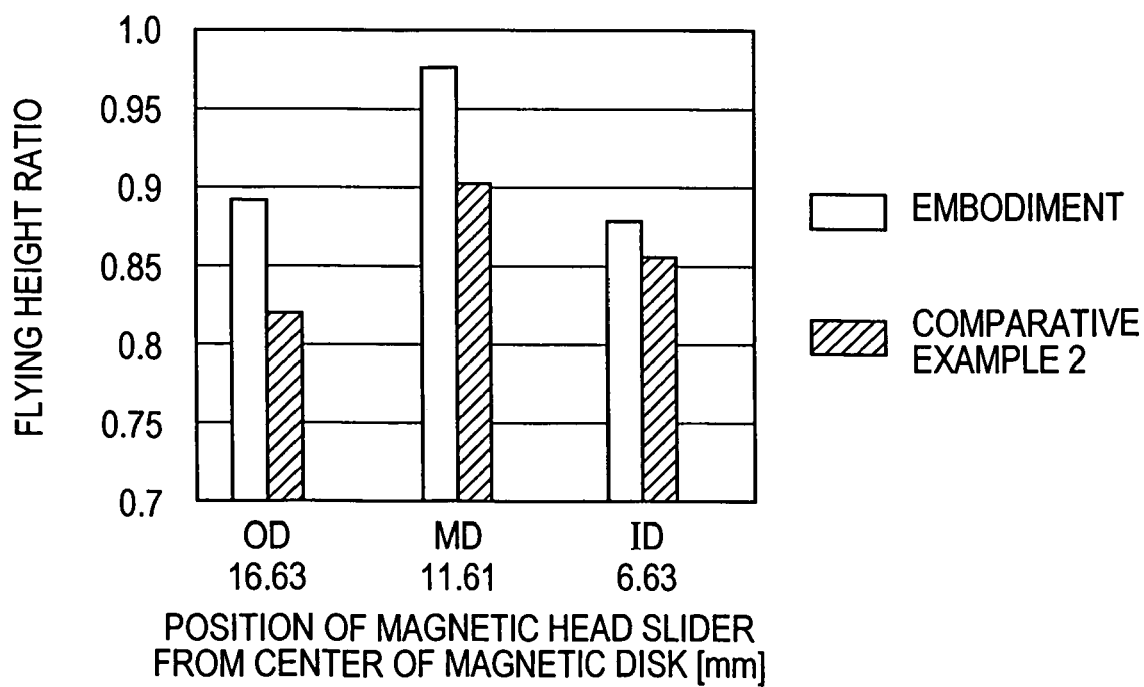
FIG. 14 is a graph illustrating, in the event of using the magnetic head slide of an embodiment and the magnetic head slider of a comparative example 2, the obtained flying height ratio (%) of the flying height of the magnetic head slider under the atmospheric pressure of high elevations (3048 m) as to the flying height of the magnetic head slider under the atmospheric pressure at sea level at each position of ID, MD, and OD over a magnetic disk D.

As shown in FIG. 14, we have recognized that the flying height ratio of the embodiment is greater than that of the comparative example 2. That is to say, we have recognized that the embodiment can reduce fluctuation of flying height due to change in atmospheric pressure small as compared with the comparative example 2.

According to the experimental results, we have found it preferable to have an arrangement wherein as shown in FIGS. 1 and 2, the first right-side groove portion 29 and first left-side groove portion 30 are divided in the lateral direction (X direction in the drawing) and formed on the trailing side St of the slider, the second right-side groove portion 31 and second left-side groove portion 32 are divided in the lateral direction (X direction in the drawing) and formed closer to the leading side S1 of the slider than the first right-side groove portion 29 and first left-side groove portion 30, and the bottom of each groove portion is taken as a negative pressure generating face. That is to say, we have found it preferable to form the four negative pressure generating faces.

Next, we measured the negative pressure generated at the first right-side negative pressure generating face 29a and first left-side negative pressure generating face 30a, and the negative pressure generated at the second right-side negative pressure generating face 31a and second left-side negative pressure generating face 32a of the magnetic head slider 1 shown in FIGS. 1 and 2. As a result, we have recognized that the negative pressure (sum of negative pressure) generated at the first right-side negative pressure generating face 29a and first left-side negative pressure generating face 30a is −0.450 gf, and the negative pressure (sum of negative pressure) generated at the second right-side negative pressure generating face 31a and second left-side negative pressure generating face 32a is −0.230 gf, and accordingly as for the absolute value of negative pressure, the negative value (absolute value) generated at the first right-side negative pressure generating face 29a and first left-side negative pressure generating face 30a is greater than the negative pressure (absolute value) generated at the second right-side negative pressure generating face 31a and second left-side negative pressure generating face 32a.

Next, we fabricated the magnetic head slider having generally the same shape as that shown in FIG. 28 of Japanese Unexamined Patent Application Publication No. 10-283622. The detailed description section regarding FIG. 28 of Japanese Unexamined Patent Application Publication No. 10-283622 describes that negative pressure is generated at the portions of the cut-outs 81a and 81b shown in FIG. 28 ([0134] paragraph of Japanese Unexamined Patent Application Publication No. 10-283622), but no detailed description is made regarding the groove portion positioned between the land portion 5 and the dynamic-pressure generating portion 2b shown in FIG. 28 of Japanese Unexamined Patent Application Publication No. 10-283622. Accordingly, the present inventor measured the negative pressure at the cut-outs 81a and 81b and the groove portion of the magnetic head slider in FIG. 28 of Japanese Unexamined Patent Application Publication No. 10-283622. Then, we have recognized that the negative pressure (sum of negative pressure) of −0.457 gf is generated at the cut-outs 81a and 81b, but no negative pressure is generated at the groove portion on the leading side. Accordingly, with the magnetic head slider shown in FIG. 28 of Japanese Unexamined Patent Application Publication No. 10-283622, four negative pressure generating faces are not formed like the magnetic head slider of the present embodiment, but only two negative pressure generating faces are formed.

Figure 15:
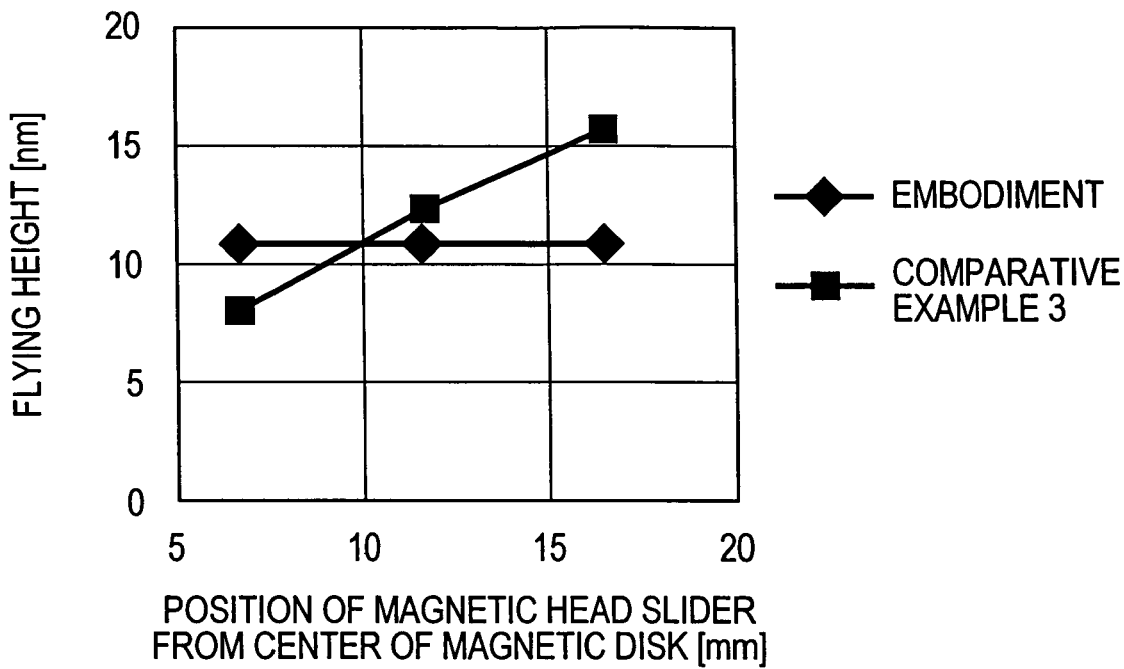
FIG. 15 is a graph illustrating, in the event of using the magnetic head slide of an embodiment and the magnetic head slider of a comparative example 3, the relationships between a position of the magnetic head slider from the center of a magnetic disk and the flying height thereof.

We have recognized that when somewhat changing the positions of the land portions 9a and 9b or the depth of the groove of the magnetic head slider (comparative example 3) for example such that the flying height ratio as to change in atmospheric pressure of the magnetic head slider in FIG. 28 shown in Japanese Unexamined Patent Application Publication No. 10-283622 (comparative example 3) is generally the same flying height ratio in the case of the magnetic head slider show in FIGS. 1 and 2 (first embodiment), as shown in FIG. 15, the flying height of the magnetic head slider (δ in FIG. 5) greatly fluctuates depending on the position of the magnetic slider from the center of the magnetic disk (the experiment is performed assuming that the atmospheric pressure is sea level), and accordingly, it may be impossible to reduce fluctuation of flying height as to change in skew angle.

Figure 16:
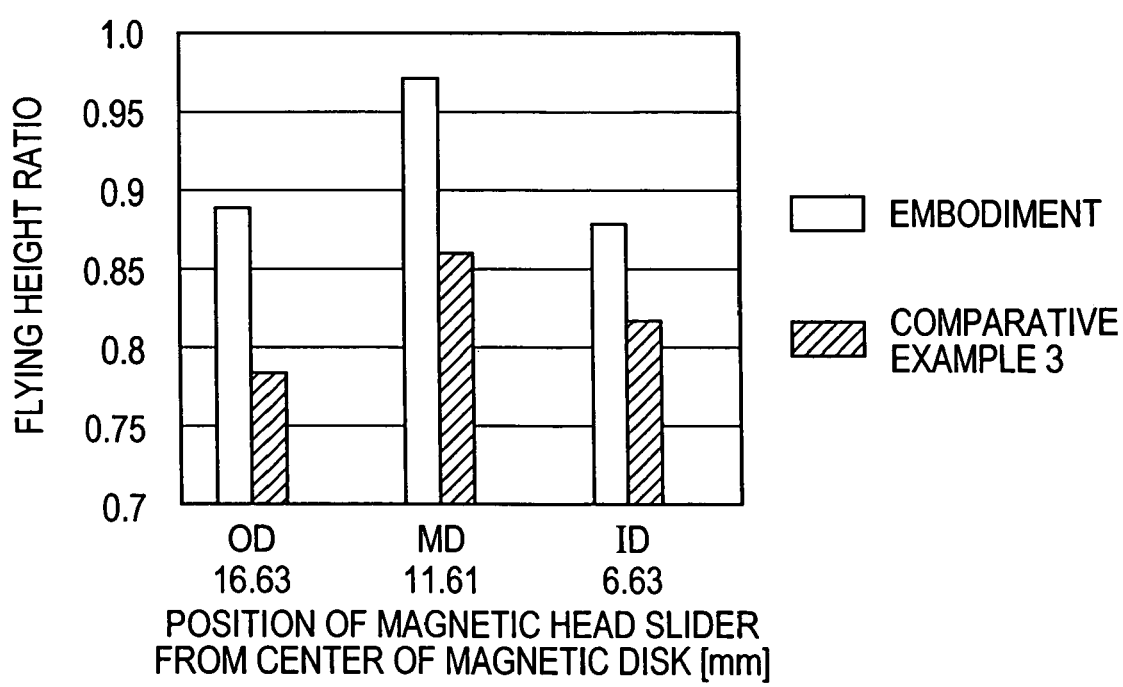
FIG. 16 is a graph illustrating, in the event of using the magnetic head slide of an embodiment and the magnetic head slider of a comparative example 3, the obtained flying height ratio (%) of the flying height of the magnetic head slider under the atmospheric pressure of high elevations (3048 m) as to the flying height of the magnetic head slider under the atmospheric pressure at sea level at each position of ID, MD, and OD over a magnetic disk D.

On the other hand, we have recognized that when adjusting such that fluctuation in flying height as to change in the skew angle of the magnetic head slider in FIG. 28 shown in Japanese Unexamined Patent Application Publication No. 10-283622 (comparative example 3) is generally the same as the case of the magnetic head slider shown in FIGS. 1 and 2 (first embodiment), this time, as shown in FIG. 16, the flying height ratio as to change in atmospheric pressure greatly deteriorates.

In FIG. 16, the flying height ratio as to change in the atmospheric pressure of the magnetic head slider of the embodiment shown in FIGS. 1 and 2 is also described. We have recognized that with the magnetic head slider of the comparative example 3, the fluctuation in flying height as to change in skew angle is great, the flying height ratio as to change in the atmospheric pressure is small as compared with the embodiment. Consequently, we have recognized that with the shape of the magnetic head slider of the comparative example 3, it may be impossible to reduce both the fluctuation in flying height as to atmospheric pressure, and the fluctuation in flying height as to change in the skew angle simultaneously, but on the other hand, with the shape of the magnetic head slider of the embodiment, both the fluctuation in flying height as to atmospheric pressure, and the fluctuation in flying height as to change in the skew angle can be reduced simultaneously.

What is claimed is:

1. A magnetic head slider comprising:
a slider; and
a magnetic element for recording and/or reproduction, which is provided on an air outflow end side of said slider;
wherein, with a direction toward the air outflow end side from an air inflow end side of said slider as a vertical direction, and a direction intersecting with said vertical direction as a lateral direction a face of said slider facing a disk includes raised faces raised toward a disk direction from bottom faces which are negative pressure generating faces, said raised faces comprises:
a magnetic element face, and the surface of said magnetic element is exposed on said air outflow end side;
an air inflow end side raised face raised with the same height as said magnetic element face and provided closer to said air inflow end side than said magnetic element face; and
a pair of rail faces disposed in opposing with a gap therebetween in the lateral direction, said rail faces connect said magnetic element face and said air inflow end side raised face and are raised with the same height as said magnetic element face and said air inflow end side raised face;
wherein said negative pressure generating faces are divided in said lateral direction by said pair of rail faces, said each of divided negative pressure generating faces comprise:
a first negative pressure generating face provided on said air outflow end side, and a second negative pressure generating face provided between said first negative pressure generating face and said air inflow end side raised face;
wherein said first negative pressure generating face has negative pressure (absolute value) greater than said second negative pressure generating face; and
wherein each of said first and second negative pressure generating faces includes the bottom face of a groove portion surrounded with raised walls at said air inflow side and both sides of said lateral direction.

2. The magnetic head slider according to claim 1, wherein a side-raised face divided and formed in said lateral direction with the same height as said magnetic element face is formed on said face facing the disk closer to said air outflow end side than said air inflow end side raised face, said side-raised face is linked with said rail face through a side-linked face extending with a height higher than said negative pressure generating face but equal to or less than said magnetic element face, and the bottom face of the groove portion surrounded with said rail face, said side-linked face, and said side-raised face serves as said first negative pressure generating face.

3. The magnetic head slider according to claim 1, wherein a side-extended face extending from both lateral sides of said air inflow end side raised face toward said air outflow end side is formed with a height higher than said negative pressure generating face but equal to or less than said magnetic element face, and the bottom face of the groove portion surrounded with said air inflow end side raised face, said rail face, and said side-extended face serves as said second negative pressure generating face.

4. The magnetic head slider according to claim 1 wherein a step face formed with a height dimension lower than said magnetic element face but higher than a negative pressure generating face, is formed between said rail faces.

5. The magnetic head slider according to claim 4, wherein said step face is formed extending between said divided air inflow side raised faces.

6. magnetic head slider according to claim 1, wherein said air inflow end side raised face is divided in said lateral direction, said pair of rail faces connect said each of divided air inflow end side raised faces and said magnetic element face, and space between said pair of rail faces penetrates to said air inflow end side.

7. A magnetic head slider comprising:
a slider; and
a magnetic element for recording and/or reproduction, which is provided on an air outflow end side of said slider;
wherein with a direction toward the air outflow end side from an air inflow end side of said slider as a vertical direction, and a direction intersecting with said vertical direction as a lateral direction a face of said slider facing a disk includes
a magnetic element face which is raised toward a disk direction, and a surface of said magnetic element is exposed,
an air inflow end side raised face raised with the same height as said magnetic element face and provided closer to said air inflow end side than said magnetic element face, and
a negative pressure generating face positioned closer to said air outflow end side than said air inflow end side raised face, which is lower than said magnetic element face;
wherein said negative pressure generating face includes
a first negative pressure generating face provided on said air outflow end side, and
a second negative pressure generating face provided closer to said air inflow end side than said first negative pressure generating face;
and wherein said first negative pressure generating face and said second negative pressure generating face are divided and provided in said lateral direction;
and wherein each of said negative pressure generating faces comprises a bottom face of a groove portion surrounded with raised walls at least at said air inflow side and at both sides of said lateral directions;
wherein on said face facing the disk is further formed
a first extended face extending from said magnetic element face toward said air inflow end side with a height higher than said negative pressure generating face but equal to or less than said magnetic element face, and
a side-raised face divided and formed in said lateral direction closer to said air outflow end side than said air inflow end side raised face,
wherein said side-raised face is linked with said first extended face through a side-linked face extending with a height higher than said negative pressure generating face but equal to or less than said magnetic element face, and the bottom face of the groove portion surrounded with raised walls of said first extended face, said side-linked face, and said side-raised face serves as said first negative pressure generating face;
wherein extended face extending from said air inflow end side raised face toward said air outflow end side is formed with a height higher than said negative pressure generating face but equal to or less than said magnetic element face, said extended face includes at least side-extended faces extending from both lateral sides of said slider toward said air outflow end side, and central extended face provided between said side-extended faces, two groove portions are formed on both lateral sides of said central extended face by surrounded with each of said side-extended faces, and each of the bottom faces of the grove portions serves as said second negative pressure generating face.

* * * * *